June 27, 1933.  F. T. COURT ET AL  1,915,355
CULTIVATING IMPLEMENT
Filed March 11, 1929   3 Sheets-Sheet 1

Inventors
Frank T. Court
Elmer McCormick
By Brown, Jackson, Boettcher & Diemer
Attorneys Witness
Milton Lenoir June 27, 1933.  F. T. COURT ET AL  1,915,355
CULTIVATING IMPLEMENT
Filed March 11, 1929  3 Sheets-Sheet 3

Patented June 27, 1933

1,915,355

UNITED STATES PATENT OFFICE

FRANK T. COURT, OF MOLINE, ILLINOIS, AND ELMER McCORMICK, OF WATERLOO, IOWA, ASSIGNORS TO DEERE & COMPANY, OF MOLINE, ILLINOIS, A CORPORATION OF ILLINOIS

CULTIVATING IMPLEMENT

Application filed March 11, 1929. Serial No. 345,929.

The present invention relates generally to cultivating implements, and in the majority of its improvements has particular reference to the attachment type of cultivating implement adapted for direct connection with a tractor so that the two function together as a unitary, power-operated cultivating implement. As will hereinafter appear, however, certain improvements of the invention also have application to other types of cultivating implements.

One of the objects of the invention is to provide an improved cultivating implement of the above type characterized by the fact that it is pushed ahead of the tractor, and comprises an implement frame which is supported at its front end on individual supporting wheels and has its rear end pivotally mounted on the tractor frame, whereby the implement follows the steering guidance of the tractor but the tractor and implement frame are free to rise and fall relatively to each other in passing over uneven ground.

Another object of the invention is to provide a cultivating implement of the above type wherein the cultivating rigs are supported for independent vertical movement relatively to the implement frame so as to be capable of rising and falling independently of each other in passing over uneven ground; to provide each of such rigs with gauge wheels held in fixed relation to the cultivator shovels or other soil working devices so as to predetermine the cultivating depth of the rigs; and to provide improved connecting means between the cultivator shovel or shovels of each rig and the implement frame, such connecting means comprising substantially parallel links effective to maintain the shovel in a definite angular relation to the ground in the vertical movement of the rig relatively to the implement frame.

Another object of the invention is to provide an improved and simplified construction of power lift mechanism deriving power from the engine of the tractor for raising all of the cultivator rigs to transport position. One of the features of the power lift mechanism is the arrangement whereby when the rigs are down in cultivating position they are free to rise and fall independently of each other, as above described, without being restricted in such movement by the power lift mechanism.

Other objects pertaining to the manner of constructing the implement frame and to other structural features of the invention will be apparent from the following description of a preferred embodiment thereof. In the accompanying drawings illustrating such embodiment:

Fig. 5 is a plan view, partly in section, showing the mounting of each lifting arm on the transverse rock shaft of the implement; and Fig. 6 is a perspective view of one of these lifting arms.

Figure 1:
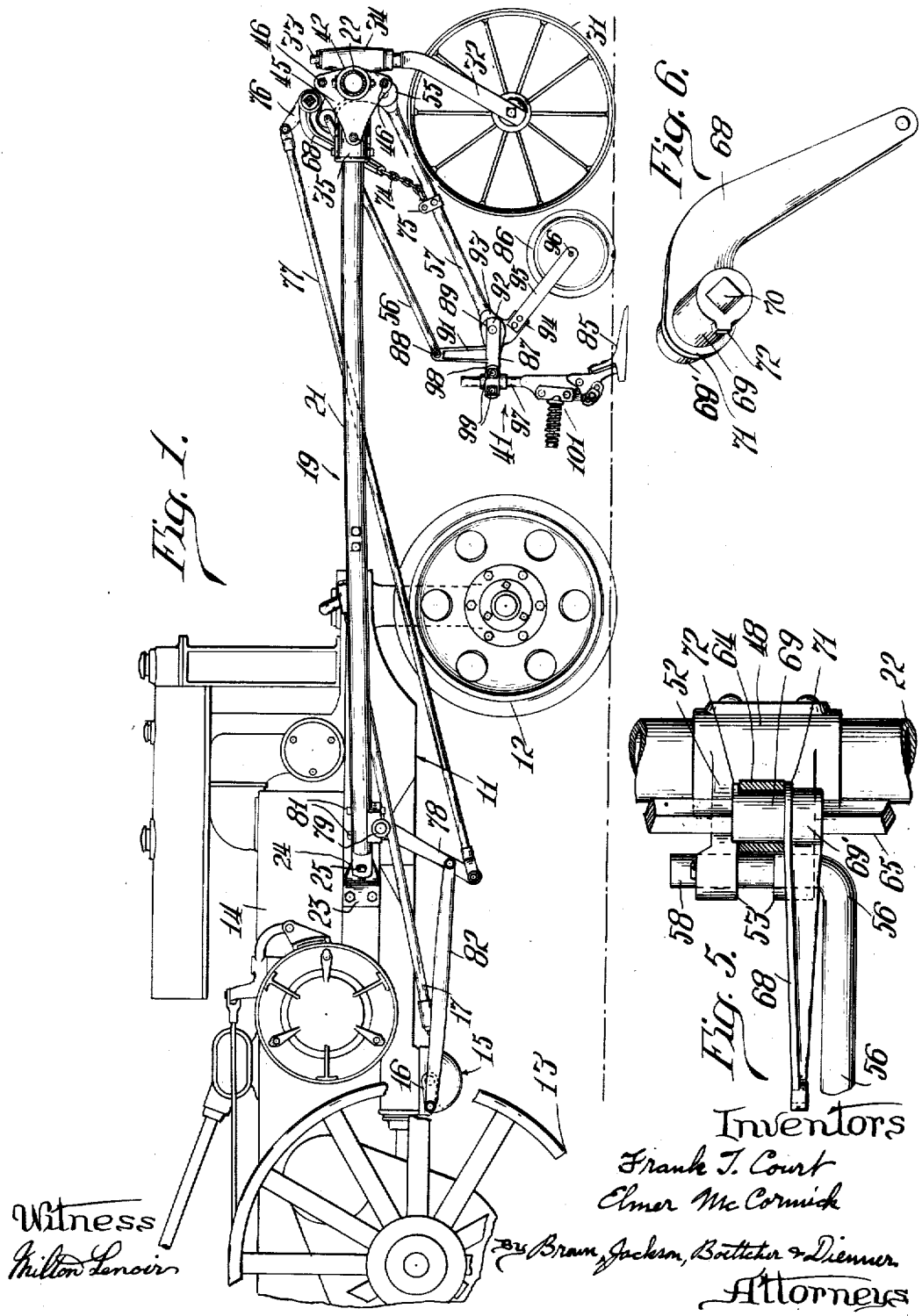
Fig. 1 is a fragmentary side view showing the tractor and cultivating implement attached in assembled relation, the frame bar extension and cultivating rig on the near side of the implement being cut away on the plane of the line 1—1 of Fig. 2.

The tractor comprises a suitable main frame structure 11 which is supported at its front end on two steering wheels 12 and at its rear end on two traction wheels 13. In the construction shown the two steering wheels 12 are disposed close together, comparable to a three wheel tractor, but it will be understood that the invention is also applicable to a four wheel tractor wherein the two steering wheels are spaced relatively far apart. The tractor motor is represented by the horizontal cylinder engine indicated at 14, from which power is transmitted through any conventional arrangement of clutch, selective speed transmission, differential mechanism and driving means to the rear traction wheels 13. In order to utilize the power of the engine for lifting the cultivator rigs to transport position the tractor is provided with a suitable power takeoff device operatively connected with the engine and arranged to actuate a power lift clutch under the control of the driver.

Such mechanism is generally indicated at 15, it being unnecessary to describe the same specifically because the details thereof constitute no part of the present invention. It will suffice to say that a power shaft extends laterally from such mechanism and supports a crank 16 adjacent to the side of the tractor frame from which lifting movement is transmitted to the cultivator rigs through linkage which will be presently described.

The steering of the front tractor wheels 12 is effected through suitable steering mechanism represented in part by the drag link 17 which is operatively connected at its front end with the steering wheels and at its rear end with a steering control wheel (not shown) located adjacent to the operator's seat at the rear end of the tractor.

Figure 2:
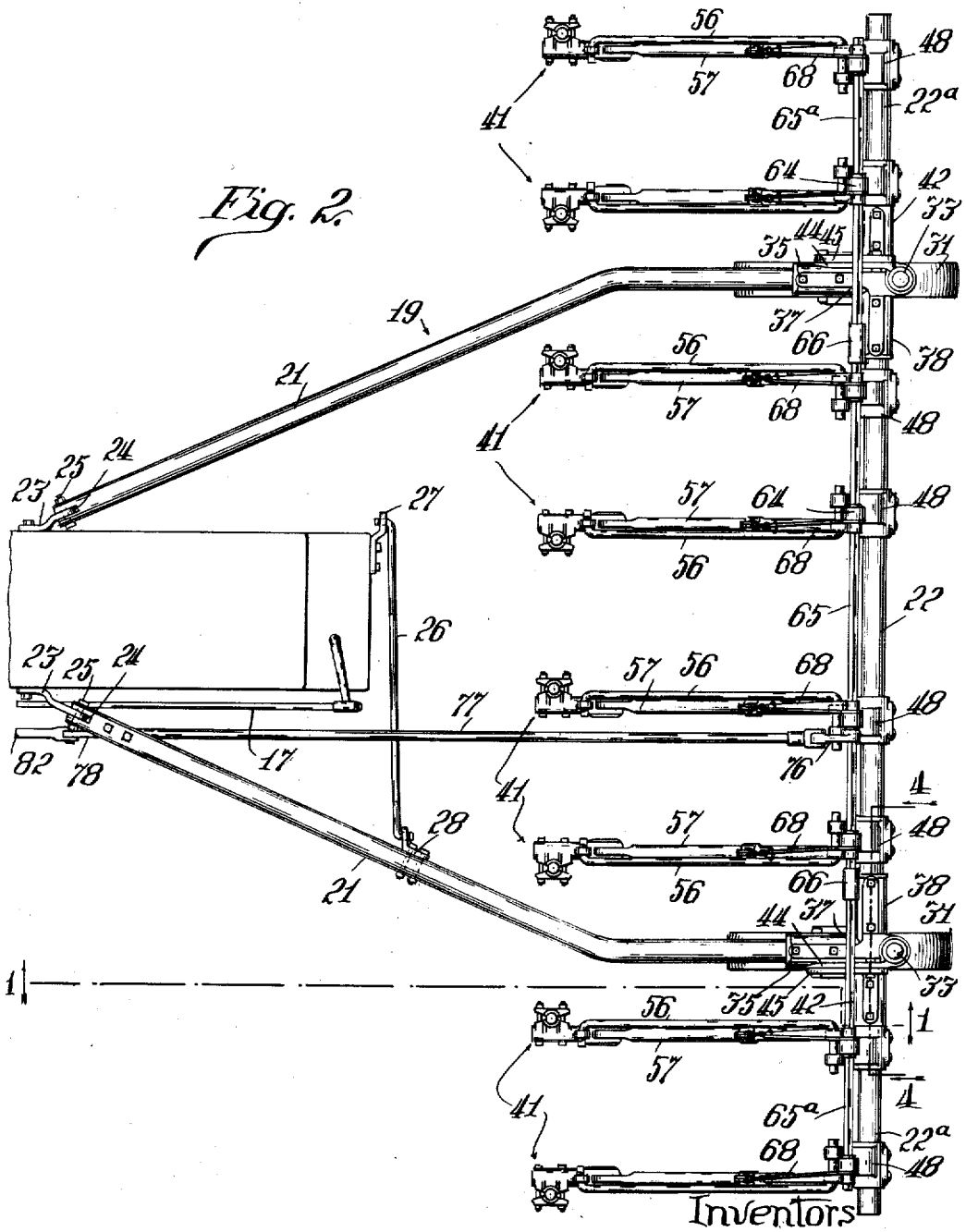
Fig. 2 is a plan view of the same.

The implement frame is indicated in its entirety at 19, and comprises the two forwardly extending frame bars 21 and the transverse front frame bar 22. As shown in Fig. 2, the rear portions of the longitudinally extending frame bars 21 are bent inwardly to converge to the sides of the tractor frame 11. Here these bars are pivotally connected to the tractor to permit relative vertical movement between the implement frame and the tractor in passing over uneven ground. Such pivotal attachment is preferably made by rigidly securing brackets 23 to the sides of the tractor frame and having pivot portions 24 projecting outwardly from these brackets for engaging in the slotted ends of the frame bars 21, pivot bolts 25 being passed horizontally through the end of each frame bar and through the pivot portion 24 of the brackets.

In detaching the implement frame from the tractor it is only necessary to remove the pivot bolts 25. Such point of pivotal attachment is preferably located back along the length of the tractor frame intermediate the front and rear wheels thereof. To aid in compelling the implement frame to swing directly with the front end of the tractor in the steering movement of the latter, a transverse guide link 26 is pivotally connected between the front end of the tractor and one of the longitudinal frame bars 21. The inner end of such link is pivotally connected with a bracket 27 secured to the front portion of the tractor, and the outer end of such link is pivoted to a clip or bracket 28 secured to one of the longitudinal frame bars 21. The pivotal connections are such that the outer end of the guide rod 26 can swing upwardly and downwardly with the vertical movement of the implement frame relatively to the tractor, such rod, however, transmitting lateral steering effort from the front end of the tractor directly to the implement frame and relieving the pivots 25 of the duty of guiding and steering the implement frame.

The front portion of the implement frame is supported on two or more caster wheels 31 located at spaced points below the transverse frame bar 22 appropriate for tracking between adjacent plant rows. Each wheel is pivotally mounted between the spaced arms of a rearwardly inclined yoke 32, the upper portion of which is formed with a vertical spindle 33 having bearing support in a bearing sleeve or boss 34 carried by the transverse frame bar 22.

Figure 3:
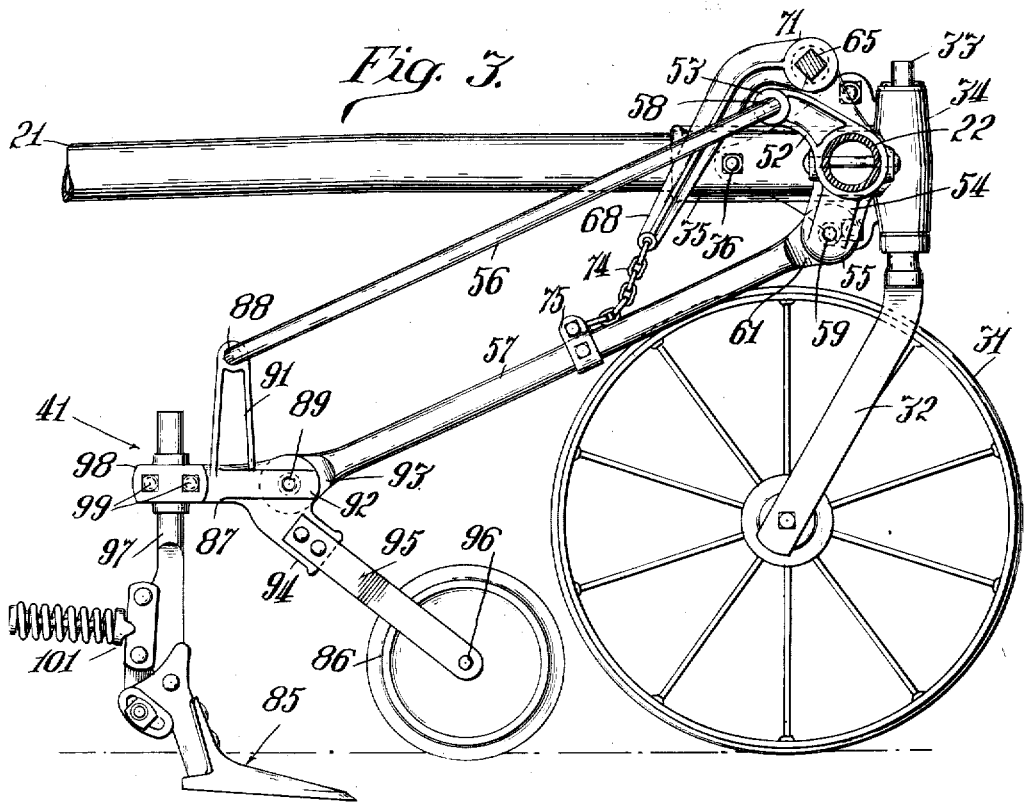
Fig. 3 is a side view on a larger scale showing the parallel link mounting of each cultivating rig on the implement frame.
Figure 4:
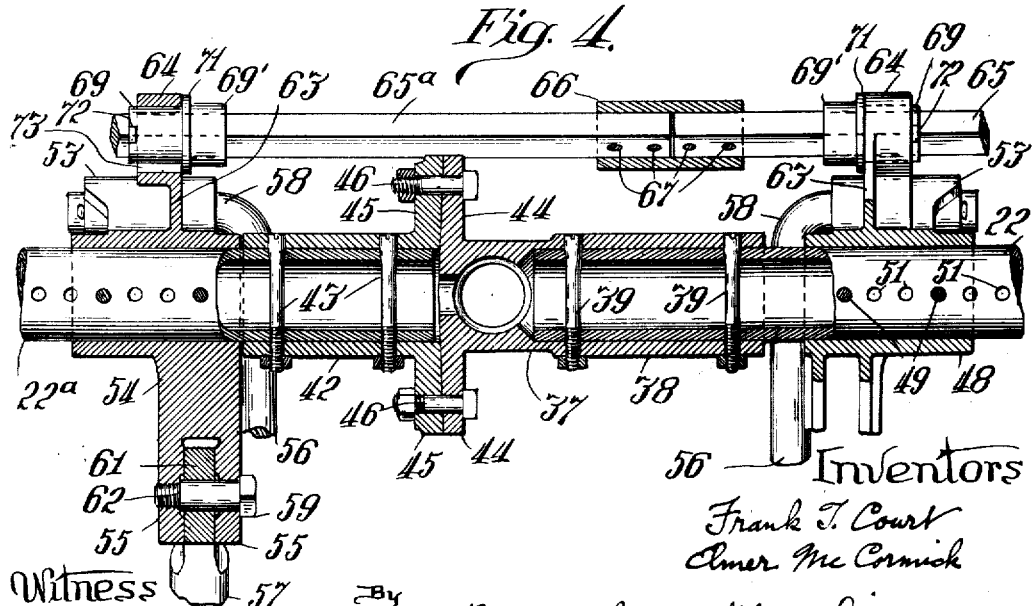
Fig. 4 is a fragmentary vertical sectional view through the front portion of the implement frame, taken approximately on the plane of the line 4—4 of Fig. 2.

As shown in Fig. 2, the frame bars 21, which preferably are of tubular section, have their front ends bent forwardly in substantially parallel relation to give clearance for the cultivator rigs on the inner sides thereof and these forwardly extending ends project into sleeve-like socket members 35 in which they are secured by transverse bolts 36 (Fig. 3). The transverse frame bar 22 is also preferably of tubular section, and each socket 35 is formed as an integral portion of a right angle bracket 37 having another sleeve-like socket portion 38 for receiving the end of the transverse frame bar 22. As shown in Fig. 4, screws or bolts 39 extend transversely through the bracket sleeve 38 and tubular bar 22 for holding the two against endwise movement and for preventing rotation of the bar 22 in the sleeve. The bearing bosses 34 in which the caster wheel spindles 33 are mounted are preferably formed as integral extensions on the forward sides of the two coupling brackets 37. It will be seen that the foregoing construction provides a triangular frame composed of three pipe bars joined at the forward corners by elbow brackets or couplings, such frame being wheel supported at its front end and pivotally connected with the tractor at its rear end.

Supported on the front frame bar 22 at spaced points across the width of the implement frame are the cultivator rigs 41. In the present construction we have shown a four-row implement comprising eight rigs, one on each side of each plant row. For such construction of implement, the tractor is designed with each of its rear traction wheels 13 spaced considerably from the body of the tractor, thereby permitting the two intermediate plant rows to pass between the traction wheels and the body of the tractor at each side thereof, the two outer plant rows being spaced outwardly beyond the traction wheels.

Owing to the considerable span, it is difficult to get such an implement through gates and other narrow spaces in transporting the implement to and from the field, and it is another object of our invention to provide a sectionalized frame which permits the two outermost pairs of rigs to be readily removed for reducing the span of the implement. To this end the front frame bar 22 is provided with two separate outer sections 22a extending outwardly beyond the coupling members 37 for supporting the outer rigs. As shown in Fig. 4, the inner end of each extension bar 22a extends into a sleeve-like coupling member 42, in which the tubular frame bar is rigidly secured by transverse screws or bolts 43. The two coupling members 37 and 42 are provided with radially extending coupling flanges 44 and 45 which are rigidly connected together by the transverse bolts 46. To remove the end sections 22a, of the front frame bar in reducing the span of the implement it is, therefore, only necessary to release the bolt 46, whereupon the coupling members 42 can be separated from the coupling members 37.

Each cultivating rig has operative connection with the front frame bar 22, 22a through a mounting collar or sleeve 48 engaging over the frame bar and secured thereto. As shown in Fig. 4, the sleeve is secured to the frame bar by two screws or bolts 49 extending transversely through the sleeve and bar. The bar is provided with a plurality of spaced holes 51 for receiving the screws 49 at different points along the bar, whereby each mounting sleeve 48 can be shifted in either direction along the bar for accommodating different row spacings between the pairs of rigs or different spacings of the rigs relatively to their individual plant rows.

As shown in Fig. 3, an arm 52 projects upwardly and rearwardly from each mounting sleeve 48 and has a bearing boss 53 formed at its end. Another arm 54 extends downwardly from each mounting sleeve and has a bifurcated bearing portion 55 formed in its lower end. These two bearing portions pivotally support the upper ends of two parallel links 56 and 57 which support the lower portion of the cultivator rig. The upper link 56 has its end bent laterally to pass through the bearing boss 53, as indicated at 58, the bent end receiving a cotter pin or any other suitable retaining device on the other side of the bearing boss. The lower link 57 is connected in the bifurcated bearing portion 55 by a pivot screw or bolt 59. This end of the link is formed with a flattened portion 61 of considerable area contacting with the flat surfaces of the relatively large bifurcated portion 55 whereby side play of the link 57 is substantially eliminated for holding the rig accurately in the desired line of travel. As shown in Fig. 4, the pivot screw 59 is provided with a reduced threaded end and a shouldered portion 62 adapted to abut against one side of the bifurcated portion 55 to prevent the screw from contracting the bifurcated portion 55 into binding engagement with the flattened pivot portion 61 of the link.

An arm 63 also projects upwardly from each mounting sleeve 48 and supports a bearing boss 64 in which a transverse rock shaft 65 is rotatably supported. Such rock shaft serves to lift the several rigs and extends across substantially the entire width of the frame.

To accommodate removal of the end sections 22a, 22a of the front frame bar, said rock shaft also comprises releasable outer sections 65a, 65a which are joined to the intermediate section of the shaft through coupling sleeves 66. As shown in Fig. 4, each of such sleeves is releasably secured to the adjacent end of the intermediate section of the rock shaft and to the adjacent end of the outer section by screws or bolts 67 extending transversely through the shafts and the sleeve. The rock shaft is of square or polygonal cross section, and mounted thereon in the plane of each rig mounting sleeve 48 is a rig lifting arm 68. Each lifting arm is provided with a hub 69 having a square or polygonal bore 70 therein engaging over the rock shaft and slidable lengthwise thereof. Such hub extends through the bearing boss 64 and forms a bearing sleeve or bushing for rotatably mounting the rock shaft in the boss 64. The hub 69 is formed with a flange or collar 71 adapted to bear against one end of the boss 64 for holding the hub 69 against shifting movement in one direction. Shifting movement in the other direction is prevented by a lug 72 projecting outwardly from the end of the hub 69 and bearing against the other end of the boss 64. To permit the lug 72 to be passed through the boss 64 the latter is provided with a longitudinal slot 73 (Fig. 4) extending from end to end thereof. By placing the lug 72 in alinement with the slot 73 the hub 69 can be pushed into the boss 64 and by then rotating the hub the lug 72 is moved out of registry with the slot 73, thereby holding the hub against displacement from the boss.

The slot 73 is so located that the normal range of lifting movement of the arm 68 will never bring the lug 72 into registry with the slot 73. The hub 69 is extended beyond the flange 71 to join with the rib which reenforces one side of the lifting arm (Fig. 3). When the mounting sleeves 48 are shifted along the frame bar 22, 22a to adjust the lateral spacing between the rig units the lifting arm 68 and hub 69 associated with such rig unit moves directly therewith, sliding freely along the rock shaft 65, 65a. The swinging end of each lifting arm 68 is operatively connected with the lower link 57 of its associated rig mounting through a chain or other flexible connecting member 74. The lower end of such chain is linked to a clamp or bracket 75 rigidly secured to the link 57.

An actuating arm 76 extends upwardly from the intermediate section 65 of the rock shaft and has pivotal connection with link 77 extending rearwardly to the tractor.

Here this link has pivotal connection with the lower end of a swinging arm 78, the upper end of which is pivotally supported in a bearing bracket 79 fastened to the under side of the adjacent implement frame bar 21 by bolts or screws 81. A second link 82 is pivotally connected between the arm 78 and the crank pin on the end of the power lift crank 16. It will be evident that forward oscillation of the crank 16 will transmit a forward thrust through the links 82 and 77 and will operate the rock shaft 65, 65a to swing the lifting arms 68 upwardly and thereby raise all of the cultivator rigs to transport position.

The power lift mechanism 15 comprises locking apparatus which functions to hold the crank 16 in each of its diametrically opposite positions, such locking mechanism thereby serving to hold the rigs raised until the lift clutch is again tripped, whereupon the crank 16 will oscillate back to its original position and lower the rigs to cultivating position.

Each cultivating rig 41 comprises a cultivator shovel or other soil working device 85, a gauge wheel 86, and a supporting member 87 on which the shovel and wheel are both supported. The rear ends of the two parallel links 56 and 57 are pivotally connected with the supporting member 87 at the two pivot centers 88 and 89. The upper pivot 88 is provided by extending a laterally bent end of the link 56 through the upper end of an arm 91 formed integral with the supporting member 87. The lower pivot 89 consists of a pivot screw, similar to the upper pivot screw 59, extending through the lower bearing portion 92 of the member 87 and through the end of the lower link 57. The bearing portion 92 is bifurcated and the link is provided with an enlarged tongue portion 93 extending between the sides of said bearing portion and having extensive area of bearing contact therewith to prevent lateral play between the supporting member 87 and the lower end of the link 57. An arm 94 integral with the supporting member 87 extends downwardly and forwardly therefrom, and has two bars 95 secured to opposite sides thereof.

The lower ends of said bars are spread to form a yoke in which the gauge wheel 86 is mounted on a transverse pivot pin 96, the two bars 95 thereby providing in effect a wheelbarrow mounting for the gauge wheel 86. The cultivator shovel 85 is mounted on a shank 97 which is adjustably secured to the supporting member 87. The shank 97 is held between the supporting member 87 and a separate clamping block 98 which is adapted to be drawn into rigid gripping engagement with the shank by two bolts 99 extending through the block on each side of the shank. The depth of cultivation is adjusted by releasing the bolts 99 and sliding the shank upwardly or downwardly in the clamping boss 98 to dispose the shovel 85 at different heights relatively to the gauge wheel 86. The shovel is preferably pivoted to the shank 97 and is connected with a conventional type of spring release mechanism 101 adapted to permit the shovel to fold backwardly relatively to the shank and prevent breakage if the shovel should strike an obstruction in the ground. The gauge wheel 86 is preferably disposed substantially in longitudinal alignment with the shovel 85.

In the operation of the machine, the implement frame is free to swing upwardly and downwardly about its rear points of pivotal connection 25 with the tractor as the wheels 31 pass upwardly and downwardly over sloping ground, the pivotal connections 25 also permitting the implement frame to rock transversely relatively to the tractor.

Each cultivator rig 41 is also free to swing upwardly or downwardly relatively to the implement frame as its individual supporting wheel 86 travels up and down sloping ground. The wheel 86, therefore, functions to maintain the predetermined depth adjustment of the cultivator shovel 85 as the rig rises and falls relatively to the implement frame. In such up and down movement of the rig the cultivator shovel 85 is held at all times in substantially the same angular relation to the horizontal owing to the characteristic motion of the parallel link connecting means 56, 57. Such links are of substantially equal length, and the spacing between their upper pivots 58 and 59 is substantially the same as the spacing between the lower pivots 88 and 89. Hence the supporting member 87 moves upwardly and downwardly with a perpendicular motion, i. e., wherein the shovel 85 remains in the same definite angular relation to the horizontal or to the ground. Also, owing to the fact that the axis of the rig supporting wheel 86 is held in fixed relation to the shovel 85 through the supporting member 87, the perpendicular movement of the supporting member 87 results in the wheel 86 always being at substantially the same vertical spacing above the level of the cultivator shovel in each of the raised and lowered positions of the cultivator rig. This is an important feature because it avoids variation in the angle of cut of the shovel and hence insures a steady, even running of the rig. For example, such perpendicular or parallel motion prevents the front end of the shovel being pointed upwardly when the rig swings downwardly, which would tend to cause the shovel to deflect itself upwardly out of the ground, and such motion also prevents the plane of the shovel being pointed downwardly when the rig swings upwardly, which would tend to cause the shovel to increase its depth of penetration beyond that determined by the gauge wheel 86.

The draft resistance of the cultivator shovel causes the upper link 56 to act under compression and the lower link 57 to act under tension, which results in the shovel running more steadily than if a single beam or connecting link were used to connect the shovel to the frame. One of the parallel links resists any tendency of the shovel to swing backward and lift out of the ground, and the other link resists any tendency of the shovel to run down into the ground to a lower line of draft, such as is true of a single beam construction. The normal up and down movement of each rig in passing over uneven ground is not restricted by the power lift mechanism, owing to the lost motion in the chain connection 74 between each lifting arm 68 and the lower rig beam or link 57. However, when the operator from his position on the rear of the tractor trips the power lift mechanism 15 the consequent oscillation of the lifting shaft 65, 65a raises all of the rigs to transport position through the arms 68 and chains 74. As previously remarked, when it is desired to reduce the span of the implement for passing through a gate or other restricted space the coupling members 37 and 42 are released at each side of the frame by removing the coupling bolts 46, and the coupling sleeves 66 are disconnected to release the outer rock shaft sections 65a, whereupon each outer section or gang comprising the frame bar extension 22a, the rock shaft extension 65a and the two outer cultivator rigs can be removed as a unit without necessitating disassembly of their respective parts. Such construction facilitates the removal and replacing of the outer sections.

While the construction above described constitutes what we regard as the preferred embodiment of our invention, it will be understood that such is merely exemplary, and that numerous modifications and rearrangements may be made therein without departing from the essence of the invention.

We claim:

1. The combination with a tractor, of a tillage implement disposed in front of the tractor comprising an implement frame, wheels supporting the front portion of said frame, means connecting the rear portion of said frame with the tractor to permit the implement frame to rise and fall relatively to the tractor, a plurality of soil tilling rigs, gauge wheels associated with said rigs to determine the tilling depth thereof, and mechanism pivotally connecting said rigs with said implement frame to permit said rigs to rise and fall relatively thereto.

2. The combination with a tractor, of a tillage implement disposed in front of the tractor comprising an implement frame, wheels supporting the front portion of said frame, means pivotally connecting the rear portion of said frame with the tractor to permit the implement frame to rise and fall relatively to the tractor, a plurality of soil tilling rigs, gauge wheels associated with said rigs to determine the tilling depth thereof, and parallel link mechanism pivotally connecting each of said rigs with said implement frame to permit said rigs to rise and fall relatively to said frame with a substantially perpendicular movement.

3. The combination with a tractor, of a cultivating implement disposed in front of the tractor comprising an implement frame, caster wheels supporting the front portion of said frame, means connecting the rear portion of said frame with the tractor to permit the implement frame to rise and fall relatively to the tractor, meanwhile holding the implement frame against lateral movement with respect to the tractor whereby said frame is guided by the steering of the tractor, a plurality of cultivating rigs, gauge wheels associated with said rigs to determine the cultivating depth thereof, and parallel link mechanism pivotally connecting said rigs with said implement frame to permit said rigs to rise and fall relatively thereto, meanwhile maintaining the rigs in the same predetermined angular relation to the ground.

4. The combination with a tractor, of a tillage implement disposed in front of the tractor comprising an implement frame, wheels supporting the front portion of said frame, means connecting the rear portion of said frame with the tractor to permit the implement frame to rise and fall relatively to the tractor, a plurality of soil tilling rigs, gauge wheels connected with said rigs to determine the tilling depth thereof, mechanism pivotally connecting said rigs with said implement frame to permit said rigs and the gauge wheel to rise and fall relatively thereto, and lifting means on said implement frame operatively connected to raise all of said rigs to transport position.

5. The combination with a tractor, of a tillage implement disposed in front of the tractor and comprising an implement frame, wheels supporting the front portion of said frame, means connecting the rear portion of said frame with the tractor to permit the implement frame to rise and fall relatively to the tractor, a plurality of soil tilling rigs, gauge wheels connected with said rigs to determine the tilling depth of said rigs, substantially parallel links pivotally connecting each rig with said implement frame to permit said rigs and the gauge wheels to rise and fall relatively to said frame while maintaining said rigs substantially in the same predetermined angular relation to the ground, and lifting mechanism on said implement frame and operatively connected with said rigs for raising all of said rigs to transport position.

6. The combination with a tractor, of a cultivating implement disposed in front of the tractor comprising an implement frame, wheels supporting the front portion of said frame, means pivotally connecting the rear portion of said frame with the tractor to permit the implement frame to rise and fall relatively to the tractor, a plurality of soil cultivating rigs, gauge wheels connected with said rigs to determine the cultivating depth of said rigs, pairs of substantially parallel links pivotally connecting each rig with said frame, said links permitting vertical movement of said rigs and the gauge wheels while maintaining the cultivating devices substantially in the same predetermined angular relation to the ground, lifting means mounted on said implement frame and operatively connected with said rigs to raise the same to transport position, and power lift mechanism deriving its operating power from the tractor for actuating said lifting means.

7. The combination with a tractor, of a tillage implement disposed in front of the tractor comprising an implement frame, wheels supporting the front portion of said frame, means connecting the rear portion of said frame with the tractor to permit the implement frame to rise and fall relatively to the tractor, a plurality of soil tilling rigs, means associated with said rigs for determining the operating position thereof, link mechanism pivotally connecting said rigs with said implement frame to permit said rigs to rise and fall relatively to said frame, lifting means on said frame, lost motion connecting means extending between said lifting means and said rigs, said lost motion connecting means permitting said rigs to rise and fall independently of each other when in tilling operation, and means on the tractor for actuating said lifting means.

8. The combination with a tractor, of a cultivating attachment disposed in front of the tractor comprising an intermediate frame section and two outer frame sections, said intermediate frame section comprising longitudinally extending bars having their rear ends pivotally connected with the tractor, caster wheels supporting the front portion of said intermediate frame section, a plurality of cultivating rigs pivotally mounted on said intermediate and outer frame sections, a lifting shaft extending transversely across said attachment, and means operatively connecting said lifting shaft with each of said rigs, said shaft being divided into separable intermediate and outer shaft sections mounted respectively on said intermediate and outer frame sections, said outer frame sections together with the rigs and shaft sections mounted thereon being removable as units from said intermediate frame section.

9. The combination with a tractor, of a cultivating attachment disposed in front of the tractor comprising a transverse frame bar, rearwardly extending frame bars secured thereto, means pivotally connecting said rearwardly extending frame bars with the tractor, caster wheels supporting said transverse frame bar, a transverse rock shaft on said frame bar, extension frame bars adapted to extend outwardly from the ends of said transverse frame bar, separable coupling members on said transverse frame bar and on said extension frame bars adapted to detachably couple said bars together, rock shaft extensions mounted on said extension frame bars, means for releasably coupling said rock shaft extensions with said transverse rock shaft, cultivating rigs pivotally mounted on said transverse frame bar and on said extension frame bars, and lifting arms on said transverse rock shaft and on said rock shaft extensions operatively connected with said cultivating rigs.

10. In a tilling implement, the combination of a frame, a tilling rig connected for lifting movement relatively to said frame, a bearing boss carried by said frame, a lifting shaft extending longitudinally of said boss, a lifting arm comprising a hub rotatably journaled in said boss, said lifting shaft non-rotatably engaging in said hub, means operatively connecting said lifting arm with the tilling rig, a shoulder on one end of said hub engaging said boss for preventing endwise movement of said hub in one direction in said boss, and a lug projecting outwardly from the other end of said hub for engaging said boss to prevent endwise movement of the hub in the other direction in said boss, said boss having a longitudinal groove formed in the bore thereof to permit said lug to be passed through said boss in the mounting of said hub therein, said lug being angularly displaced from said groove in the normal oscillatory movement of said lifting shaft.

11. The combination with a tractor, of a cultivating attachment disposed in front of the tractor comprising a frame, caster wheels supporting the front portion of said frame, means connecting the rear portion of said frame with the tractor to permit the frame to rise and fall relatively to the tractor, the frame being steered directly by the tractor, a plurality of cultivating rigs each comprising a supporting member, a cultivating shovel mounted on said member and normally held in fixed relation thereto, a gauge wheel mounted on said supporting member with its axis normally held in fixed relation thereto and a pair of parallel links pivotally connected between the supporting member of each rig and said frame, said links permitting said supporting members to rise and fall relatively to said frame and independently of each other with a substantially perpendicular movement.

12. The combination with a tractor, of a cultivating attachment disposed in front of the tractor comprising a frame, caster wheels supporting the front portion of said frame, means connecting the rear portion of said frame with the tractor to permit said frame to rise and fall relatively to the tractor, a plurality of cultivating rigs each comprising a supporting member, a gauge wheel mounted thereon with its axis held in fixed relation to said supporting member, a cultivating shovel mounted on said supporting member and normally held in fixed relation thereto, means permitting depth adjustments of said cultivating shovel relatively to said supporting member and to said gauge wheel, and a pair of parallel links pivotally connected between the supporting member of each rig and said frame, said links permitting said supporting members to rise and fall relatively to said frame and independently of each other with a substantially perpendicular movement.

13. The combination with a tractor, of a cultivating attachment disposed in front of the tractor comprising a frame, caster wheels supporting the front portion of said frame, means connecting the rear portion of said frame with the tractor to permit said frame to rise and fall relatively to the tractor, a plurality of cultivating rigs each comprising a supporting member, a gauge wheel mounted thereon with its axis held in fixed relation to said supporting member, a cultivating shovel mounted on said supporting member and normally held in fixed relation thereto, means permitting depth adjustments of said cultivating shovel relatively to said supporting member and to said gauge wheel, a pair of parallel links pivotally connected between the supporting member of each rig and said frame, said links permitting said supporting members to rise and fall relatively to said frame and independently of each other with a substantially perpendicular movement, and lifting means on said frame operatively connected with all of said rigs for raising the same to transport position.

14. The combination with a tractor, of a cultivating attachment disposed at the front end of the tractor comprising a frame, wheels supporting a portion of said frame, means connecting said frame with the tractor, a plurality of cultivating rigs each comprising a supporting member, a gauge wheel mounted directly on said supporting member, a cultivating shovel mounted on said supporting member and normally held in fixed relation thereto, and a pair of parallel links pivotally connected between the supporting member of each rig and said frame, said links permitting said rigs to rise and fall relatively to said frame and independently of each other with a substantially perpendicular movement.

15. The combination with a tractor, of a cultivating attachment adapted to be pivotally connected therewith comprising a frame, a plurality of cultivator rigs, each rig comprising a single cultivating tool, parallel link mechanism pivotally connecting each tool with said frame for independent vertical movement in substantially perpendicular paths, lifting means on said frame, and lost motion connecting means extending between said lifting means and said rigs.

16. A cultivating implement comprising a frame, a plurality of cultivator rigs each including a single soil working device and a gauge wheel having its axis normally held in fixed relation to said soil working device arranged to operate on the undisturbed surface of the ground, the gauge wheels being connected with the rigs at points in advance of the connections of the soil working devices with the rigs and a pair of links pivotally connecting each of said rigs with said frame for independent vertical movement relative to said frame, said links being substantially parallel and of substantially equal length whereby to maintain the soil working device in approximately the same angular relation to the horizontal in the vertical movement of the rig, a lifting rock shaft on said frame, and lost motion connecting means extending between said rock shaft and said rigs.

17. A cultivator attachment including a frame, a cultivator rig, means connecting the rig with said frame for free vertical movement in substantially constant angular relation to the ground comprising upper and lower parallel links connected with the frame and with the rig to swing in a vertical plane, means adapted to contact with the undisturbed ground for controlling the operating position of the rig, a lifting rock shaft mounted on said frame, and flexible means connecting said rig with said rock shaft.

18. A cultivator attachment including a frame, a cultivator rig, means connecting the rig with said frame for free vertical movement in substantially constant angular relation to the ground comprising upper and lower parallel links connected with the frame and with the rig to swing in a vertical plane, ground engaging means adapted to contact with the undisturbed ground and connected with the rig to rise and fall therewith, for controlling the operating position of the rig, lifting means mounted on said frame, and flexible means connecting said rig with said lifting means.

19. The combination with a tractor, of a tillage implement movably connected with the tractor and comprising an implement frame, means connecting the frame with the tractor, a plurality of soil tilling rigs, each rig comprising a single cultivating tool, gauge wheels associated with each tool to determine the tilling depth thereof, mechanism pivotally connecting each of said tools with said implement frame to permit said tools to rise and fall relatively thereto, a lifting rock shaft on said frame, and lost motion connecting means between said rock shaft and said rigs.

20. The combination with a tractor, of a cultivating implement connected with the tractor and comprising an implement frame, means connecting said frame with the tractor whereby said frame is guided by the steering of the tractor, a plurality of cultivating rigs, gauge wheels associated with said rigs to determine the cultivating depth thereof, parallel link mechanism pivotally connecting said rigs with said implement frame to permit said rigs to rise and fall relatively thereto, meanwhile maintaining the rigs in the same predetermined angular relation to the ground, a rock shaft mounted on said frame and operatively connected with each of said rigs for controlling the raising and lowering of said rigs, and power lift means for rocking said rock shaft.

21. The combination with a tractor, of a tillage implement connected with the tractor and comprising an implement frame, means connecting the frame with the tractor, a plurality of soil tilling rigs, gauge wheels connected with said rigs to determine the tilling depth thereof, mechanism pivotally connecting said rigs with said implement frame to permit said rigs and the gauge wheel to rise and fall relatively to the frame, and lifting means on said frame operable to simultaneously raise all of said rigs to transport position.

22. The combination with a tractor, of a cultivating implement connected with the tractor and comprising an implement frame, means pivotally connecting said frame with the tractor, a plurality of soil cultivating rigs, gauge wheels connected with said rigs to determine the cultivating depth of said rigs, pairs of substantially parallel links pivotally connecting each rig and gauge wheel with said frame, said links permitting vertical movement of said rigs and the gauge wheels while maintaining the cultivating devices substantially in the same predetermined angular relation to the ground, lifting means operatively connected with said rigs to raise the same to transport position, and power lift mechanism deriving its operating power from the tractor for actuating said lifting means.

23. The combination with a tractor, of a tillage implement connected with the tractor and comprising an implement frame, means connecting the frame with the tractor, a plurality of soil tilling rigs, means associated with said rigs for determining the operating position thereof, link mechanism pivotally connecting said rigs with said implement frame to permit said rigs to rise and fall relatively to said frame, lifting means on said frame, lost motion connecting means extending between said lifting means and said rigs, said lost motion connecting means permitting said rigs to rise and fall independently of each other when in tilling operation, and means on the tractor for actuating said lifting means.

24. The combination with a tractor, of a cultivating attachment connected with the tractor and comprising an intermediate frame section and two outer frame sections, a plurality of cultivating rigs pivotally mounted on said intermediate and outer frame sections, a lifting shaft extending transversely across said attachment, power operated lifting mechanism on the tractor connected with the lifting shaft for rocking the same, and means operatively connecting said lifting shaft with each of said rigs, said shaft being divided into separable intermediate and outer shaft sections mounted respectively on said intermediate and outer frame sections, said outer frame sections together with the rigs and shaft sections mounted thereon being removable as units from said intermediate frame section.

25. The combination with a tractor, of a cultivating attachment connected with the tractor and comprising a transverse frame bar, a transverse rock shaft on said frame bar, extension frame bars adapted to extend outwardly from the ends of said transverse frame bar, separable coupling members on said transverse frame bar and on said extension frame bars adapted to detachably couple said bars together, rock shaft extensions mounted on said extension frame bars, means for releasably coupling said rock shaft extensions with said transverse rock shaft, cultivating rigs pivotally mounted on said transverse frame bar and on said extension frame bars, lifting arms on said transverse rock shaft and on said rock shaft extensions operatively connected with said cultivating rigs, and power operated lifting mechanism on the tractor connected with the transverse rock shaft for rocking the same.

26. In a tilling implement, the combination of a frame, a tilling rig connected for lifting movement relatively to said frame, a bearing boss carried by said frame, a lifting shaft extending longitudinally of said boss, a lifting arm comprising a hub rotatably journaled in said boss, said lifting shaft nonrotatably engaging in said hub, means operatively connecting said lifting arm with the tilling rig, and means on one end of said hub for preventing endwise movement of said hub in said boss.

27. In a tilling implement, the combination of a frame, a tilling rig connected for lifting movement relatively to said frame, a bearing boss carried by said frame, a lifting shaft extending longitudinally of said boss, a lifting arm comprising a hub rotatably journaled in said boss, said lifting shaft non-rotatably engaging in said boss, said lifting shaft non-rotatably engaging in said hub, means operatively connecting said lifting arm with the tilling rig, and means for preventing endwise movement of said hub in said boss.

28. In a tilling implement, the combination of a frame, a tilling rig connected for lifting movement relatively to said frame, a bearing boss carried by said frame, a lifting shaft extending longitudinally of said boss, a lifting arm comprising a hub rotatably journaled in said boss, said lifting shaft non-rotatably engaging in said hub, means operatively connecting said lifting arm with the tilling rig, and means cooperating with the hub for preventing endwise movement of the lifting shaft in the boss.

29. An agricultural implement of the class described comprising, in combination, a frame, a plurality of tilling rigs connected for lifting movement relatively to said frame, a plurality of bearing bosses carried on the frame, a lifting shaft extending longitudinally through the bosses, a plurality of lifting arms secured to the lifting shaft to turn therewith one adjacent each bearing boss and on opposite sides of neighboring bosses.

30. The combination with a tractor, of a cultivating attachment connected with the tractor and comprising a frame, means pivotally connecting the frame with the tractor, a plurality of cultivating rigs connected with the frame and each comprising a supporting member, a gauge wheel mounted thereon with its axis held in fixed relation to said supporting member, a cultivating shovel mounted on said supporting member and normally held in fixed relation thereto, means permitting depth adjustments of said cultivating shovel relatively to said supporting member and to said gauge wheel, and a pair of parallel links pivotally connected between the supporting member of each rig and said frame, said links permitting said supporting members to rise and fall relatively to said frame and independently of each other with a substantially perpendicular movement.

31. The combination with a tractor, of a cultivating attachment connected with the tractor and comprising a frame, means connecting the frame with the tractor, a plurality of cultivating rigs connected with the frame and each comprising a supporting member, a gauge wheel mounted thereon with its axis held in fixed relation to said supporting member, a cultivating shovel mounted on said supporting member and normally held in fixed relation thereto, means permitting depth adjustments of said cultivating shovel relatively to said supporting member and to said gauge wheel, a lifting rock shaft on the frame operatively connected with all of said rigs for raising the same to transport position, said rock shaft being actuated from the tractor, and flexible means connecting said rigs with said rock shaft whereby each of said rigs may rise and fall independently of the other of said rigs.

32. The combination with a tractor having a power lift, of a cultivating attachment comprising a frame adapted to be pivotally connected with the tractor adjacent the forward end thereof, a plurality of cultivator rigs pivotally connected to the frame for independent vertical movement, and connections between each of the cultivator rigs and the power lift including parts mounted on said frame whereby the rigs may be raised to transport position.

33. The combination with a tractor, of a cultivating attachment disposed in front of the tractor comprising a frame, caster wheels supporting the front portion of said frame, means connecting the rear portion of said frame with the tractor to permit the frame to rise and fall relatively to the tractor, the frame being steered directly by the tractor, a plurality of cultivating rigs each comprising a supporting member, a cultivating shovel mounted on said member and normally held in fixed relation thereto, a gauge wheel mounted on said supporting member with its axis normally held in fixed relation thereto, and a pair of parallel links pivotally connected between the supporting member of each rig and said frame, said links permitting said supporting members to rise and fall relatively to said frame and independently of each other with a substantially perpendicular movement but preventing relative lateral movement between the supporting member and the frame.

34. A cultivator attachment including a frame, a rock shaft journaled therein, a cultivator rig, means connecting the rig with said frame for free vertical movement in substantially constant angular relation to the ground comprising upper and lower parallel links connected with the frame and with the rig to swing in a vertical plane, means connecting the rig and rock shaft whereby the former may be operated by the latter, and gauging means to gauge the height of the rig with reference to the ground surface.

35. A cultivator attachment including a frame, a rock shaft journaled in the frame, a cultivator rig, means connecting the rig with said frame for free vertical movement in substantially constant angular relation to the ground comprising upper and lower parallel links connected with the frame and with the rig to swing in a vertical plane, means connecting the rig and shaft whereby the former may be operated by the latter and the latter may move independently of the former, and gauging means contacting with the ground surface for each rig.

36. A cultivator comprising a frame including a transverse bar, a plurality of rigs, means connecting each rig with the bar comprising a member having a sleeve portion embracing the bar in non-rotatable relation and arms having bearing supports, link means connected at one end to the bearing supports and to the rig at their other ends, a rock shaft journaled in another of the bearing supports of the members and operatively connected to elevate the rigs.

37. A cultivator comprising a frame including a transverse bar, a plurality of rigs, means connecting each rig with the bar comprising a member having a sleeve portion embracing the bar and slidable therealong, means adapted to secure the sleeve to the bar at different points along the bar, said member also having portions extending transversely of the sleeve portion and providing a plurality of bearing bosses, rig connecting links journaled in certain of said bosses, and means to raise the rigs journaled in another of said bosses.

38. The combination with a tractor, of a cultivating attachment adapted to be connected therewith including a bar, a plurality of cultivator rigs, each rig comprising a single cultivating tool, parallel link mechanism pivotally connecting each tool with said bar for independent vertical movement in substantially perpendicular paths, a lifting rock shaft mounted on said bar, and flexible means connecting each of said rigs with said rock shaft.

39. The combination with a tractor, of a tillage implement connected with the tractor and comprising a transverse implement frame bar, means connecting the frame bar with the tractor, a plurality of soil tilling rigs, each rig comprising a single cultivating tool, gauge wheels associated with each tool to determine the tilling depth thereof, mechanism pivotally connecting each of said tools with said implement frame bar to permit said tools to rise and fall relatively thereto, and power lift means including a rock shaft disposed above the frame bar and adjacent the connection of said mechanism therewith and deriving power from the tractor motor for raising and lowering said rigs.

40. A wheel supported motor propelled frame, frame bars detachably connected to said frame and extending laterally from opposite sides thereof, releasable means for detachably holding said frame bars against movement relative to said frame, a rock shaft rockably mounted on the wheel supported frame, rock shafts mounted on each of the laterally extending frame bars, cultivator rigs pivotally connected to said laterally extending frame bars, lifting connections between said rigs and the rock shafts carried by the frame bars, connections between the rock shaft on the wheel supported frame and the rock shafts on the laterally extending frame bars, and means for rocking the rock shaft on the wheel supported frame.

41. A wheel supported motor propelled frame, draft members detachably connected to said frame and extending laterally from opposite sides thereof, lifting means mounted on said wheel supported frame, rock shafts mounted on each of said laterally extending draft members, means operatively connecting said lifting means with said rock shafts whereby said rock shafts are rocked by operation of said means, a plurality of soil cultivating rigs associated with each of said draft members, gauge wheels connected with said rigs to determine the cultivating depth of said rigs, pairs of substantially parallel links pivotally connecting each rig and the gauge wheels with its respective draft member, said links permitting vertical movement of said rigs and the gauge wheels while maintaining the cultivating devices substantially in the same predetermined angular relation to the ground, and connections between said last-named rock shafts and said rigs for raising said rigs by rocking of said rock shafts, and power lift mechanism deriving power from the tractor for operating said lifting means.

42. A wheel supported motor propelled frame, draft members detachably connected to said frame and extending laterally from opposite sides thereof, a plurality of cultivator rigs for each of said members, means connecting said rigs with said frames for free vertical movement in substantially constant angular relation to the ground comprising upper and lower parallel links connected with the frames and with the rigs to swing in a vertical plane, lifting means mounted on said wheel supported frame, rock shafts carried by each of said draft members, means connecting the rigs of each draft member with their respective rock shaft whereby the former may be operated by the latter, and gauging means connected with each rig to gauge the height of the rig with reference to the ground surface, means connecting said lifting means with said rock shafts whereby the latter are rocked by operation of the former, and power lift mechanism for operating said lifting means.

43. The combination with a tractor, of a cultivating attachment connected with the tractor and comprising two frame sections, a plurality of cultivating rigs pivotally mounted on said frame sections, a lifting shaft extending transversely across said attachment, means operatively connecting said lifting shaft with each of said rigs, said shaft being divided into separable sections mounted respectively on said two frame sections, said frame sections together with the rigs and shaft sections mounted thereon being removable as units, power operated lifting mechanism on the tractor connected with one of said shaft sections for rocking the same, and means interconnecting said shaft sections whereby said sections operate in unison.

44. The combination with a tractor, of a tillage implement disposed in front of the tractor comprising a wheel supported frame and push bars connecting said implement with the tractor whereby the former is propelled by the latter in advance thereof, a plurality of soil tilling rigs, a gauge wheel associated with each of said rigs to determine the tilling depth thereof, and mechanism comprising vertically spaced links pivotally connecting said rigs and said gauge wheels with said implement frame to permit said rigs and said gauge wheels to rise and fall relatively thereto.

45. A farm implement comprising a power unit including a frame supported on propelling and steering wheels, a tillage unit arranged to be propelled thereby, including a frame having supporting means engaging the ground in advance of the power unit, and provided with tillage devices, a pair of longitudinally extending push bars pivotally connected at their rear ends to opposite sides of the power unit and having their forward ends fixedly connected with said tillage unit to permit said tillage unit to move vertically relatively to said power unit, and means to hold the tillage unit against lateral swinging with respect to the power unit comprising a link connected with the front end of the power unit frame and at least one of said push bars, whereby the tillage unit is guided by the steering of the power unit.

46. The combination with a tractor, of a cultivator attachment adapted to be connected therewith including a bar, a plurality of cultivator rigs, means pivotally connecting each of said rigs with said bar comprising two vertically spaced links disposed in a substantially longitudinal vertical plane to permit said rigs to rise and fall relatively to said bar, a lifting rock shaft mounted on said bar, and flexible means connecting each of said rigs with said rock shafts.

47. The combination with a tractor, of a cultivator attachment adapted to be connected therewith including a bar, a plurality of cultivator rigs, means for pivotally connecting each of said rigs with said bar comprising two vertically spaced links disposed in a substantially longitudinal vertical plane to permit said rigs to rise and fall relatively to said bar, and gauge means associated with each of said rigs and disposed in advance thereof to determine the tilling depth thereof.

48. A cultivator attachment including a frame, a rock shaft journaled therein, a cultivator rig, means connecting the rig with said frame for free vertical movement comprising two vertically spaced links disposed in a substantially longitudinal vertical plane and connected with the frame and with the rig to swing in a vertical plane, means connecting the rig and rock shaft whereby the former may be operated by the latter, and gauging means to gauge the height of the rig with reference to the ground surface.

49. A cultivator attachment including a frame, a rock shaft journaled in the frame, a cultivator rig, means connecting the rig with said frame for free vertical movement comprising two vertically spaced links disposed in a substantially longitudinal vertical plane and connected with the frame and with the rig to swing vertically, means connecting the rig and shaft whereby the former may be operated by the latter, and the latter may move independently of the former, and gauging means contacting with the ground surface for each rig.

50. The combination with a tractor, of a cultivating attachment adapted to be connected therewith comprising two transverse members, cultivator rigs carried by said transverse members, releasable means for detachably connecting said transverse members, a pushing member connected with the tractor and with said transverse members, and means carried by said connecting means for receiving said pushing member.

51. The combination with a tractor, of a cultivating attachment adapted to be connected therewith comprising two transverse members, releasable means for detachably connecting said transverse members, a pushing member connected with the tractor and with said transverse members, said connecting means including a socket for receiving one of the transverse members, and a second socket extending at right angles to said first mentioned socket for receiving said pushing member.

52. The combination with a tractor, of a cultivating attachment adapted to be connected therewith comprising two members extending outwardly of the tractor in substantial alignment, releasable means disposed transversely of said members for detachably connecting said members together, and a pushing member connected with the tractor and with said transverse members adjacent said releasable connecting means.

53. The combination with a tractor, of a cultivating attachment adapted to be connected therewith comprising two members extending transversely of the tractor, a connecting flange carried by and extending at right angles to each of said members at their adjacent ends, releasable means for detachably connecting said flanges together, and a pushing member connected with the tractor and with said transverse members adjacent said connecting flanges.

54. The combination with a tractor, of a cultivating attachment adapted to be connected therewith comprising two members extending transversely of the tractor, a separately formed flanged member connected with each of said transverse members at their adjacent ends, the flanges of said flanged members extending substantially at right angles to said transverse members, releasable means for detachably connecting said flanges together, and a pushing member connected with the tractor and with said transverse members adjacent said connecting flanges.

In witness whereof, I hereunto subscribe my name this 5th day of March, 1929.
FRANK T. COURT.

In witness whereof, I hereunto subscribe my name this 7th day of March, 1929.
ELMER McCORMICK.

CERTIFICATE OF CORRECTION.

Patent No. 1,915,355.     June 27, 1933.

FRANK T. COURT, ET AL.

It is hereby certified that error appears in the printed specification of the above numbered patent requiring correction as follows: Page 7, lines 85, 86, 87 and 88, claim 16, strike out the comma and words ", the gauge wheels being connected with the rigs at points in advance of the connections of the soil working devices with the rigs and" and insert the same after "device" in line 83 of same claim; and that the said Letters Patent should be read with this correction therein that the same may conform to the record of the case in the Patent Office.

Signed and sealed this 22nd day of August, A. D. 1933.

(Seal)     M. J. Moore.
Acting Commissioner of Patents.

with said transverse members adjacent said connecting flanges.

54. The combination with a tractor, of a cultivating attachment adapted to be connected therewith comprising two members extending transversely of the tractor, a separately formed flanged member connected with each of said transverse members at their adjacent ends, the flanges of said flanged members extending substantially at right angles to said transverse members, releasable means for detachably connecting said flanges together, and a pushing member connected with the tractor and with said transverse members adjacent said connecting flanges.

In witness whereof, I hereunto subscribe my name this 5th day of March, 1929.
FRANK T. COURT.

In witness whereof, I hereunto subscribe my name this 7th day of March, 1929.
ELMER McCORMICK.

CERTIFICATE OF CORRECTION.

Patent No. 1,915,355.　　　　　　　　　　　　　　　　June 27, 1933.

FRANK T. COURT, ET AL.

It is hereby certified that error appears in the printed specification of the above numbered patent requiring correction as follows: Page 7, lines 85, 86, 87 and 88, claim 16, strike out the comma and words ", the gauge wheels being connected with the rigs at points in advance of the connections of the soil working devices with the rigs and" and insert the same after "device" in line 83 of same claim; and that the said Letters Patent should be read with this correction therein that the same may conform to the record of the case in the Patent Office.

Signed and sealed this 22nd day of August, A. D. 1933.

(Seal)
M. J. Moore.
Acting Commissioner of Patents.

CERTIFICATE OF CORRECTION.

Patent No. 1,915,355.                                              June 27, 1933.

FRANK T. COURT, ET AL.

It is hereby certified that error appears in the printed specification of the above numbered patent requiring correction as follows: Page 7, lines 85, 86, 87 and 88, claim 16, strike out the comma and words ", the gauge wheels being connected with the rigs at points in advance of the connections of the soil working devices with the rigs and" and insert the same after "device" in line 83 of same claim; and that the said Letters Patent should be read with this correction therein that the same may conform to the record of the case in the Patent Office.

Signed and sealed this 22nd day of August, A. D. 1933.

(Seal)

M. J. Moore.
Acting Commissioner of Patents.